United States Patent [19]

Yoshizumi et al.

[11] Patent Number: 4,785,712
[45] Date of Patent: Nov. 22, 1988

[54] HYDRAULIC OPERATING APPARATUS FOR ELECTRIC CIRCUIT BREAKER

[75] Inventors: Toshiaki Yoshizumi; Tsutomu Sugiyama, both of Amagasaki, Japan

[73] Assignee: Mitsubishi Denki Kabushiki Kaisha, Japan

[21] Appl. No.: 867,215

[22] Filed: May 27, 1986

[51] Int. Cl.[4] .................. H01H 35/38; H01H 33/30; F15B 13/043; F15B 15/17

[52] U.S. Cl. .......................... 91/43; 91/25; 91/42; 91/44; 91/395; 91/403; 91/417 R; 91/393; 200/82 B

[58] Field of Search ..................... 91/42–45, 91/25, 395, 396, 403, 26, 408, 409, 410, 417 R, 170 R, 461, 304, 393; 92/27, 28, 62; 200/82 A, 82 B

[56] References Cited

U.S. PATENT DOCUMENTS

| 2,412,053 | 12/1946 | Lucien | 91/44 |
|---|---|---|---|
| 2,598,446 | 5/1952 | Schneider | 91/170 R X |
| 3,033,171 | 5/1962 | Engelbrecht et al. | 92/27 X |
| 3,047,697 | 7/1962 | Forwald | 200/148 |
| 3,105,126 | 9/1963 | Peek et al. | 91/417 R X |
| 3,334,202 | 8/1967 | Tognella | 200/82 |
| 3,359,862 | 12/1967 | Modrich | 91/42 |
| 3,472,125 | 10/1969 | Noble | 91/417 R X |
| 3,863,547 | 2/1975 | Meier et al. | 91/417 R X |
| 3,885,454 | 5/1975 | Grieger et al. | 91/25 X |
| 3,969,985 | 7/1976 | Grieger et al. | 200/82 B X |
| 3,999,464 | 12/1976 | Grieger et al. | 91/396 X |
| 4,026,523 | 5/1977 | Gratzmuller | 91/396 X |
| 4,166,937 | 9/1979 | Imam et al. | 200/82 B |
| 4,289,063 | 9/1981 | Nakamura | 91/403 X |
| 4,343,972 | 8/1982 | Bischofberger et al. | 91/417 R X |
| 4,516,472 | 5/1985 | Kobayashi | 91/457 X |
| 4,519,329 | 5/1985 | Vacher | 91/44 X |
| 4,554,861 | 11/1985 | Gassner et al. | 91/403 X |
| 4,638,718 | 1/1987 | Nakamura | 91/396 X |
| 4,669,265 | 6/1987 | Gratzmuller | 200/82 B X |

FOREIGN PATENT DOCUMENTS

| 2128648 | 12/1972 | Fed. Rep. of Germany | 200/82 B |
| 2905102 | 2/1979 | Fed. Rep. of Germany | . |
| 2835063 | 2/1980 | Fed. Rep. of Germany | 91/417 R |
| 3048814 | 9/1981 | Fed. Rep. of Germany | 91/417 R |
| 1243632 | 1/1960 | France | . |
| 2333144 | 6/1977 | France | 91/396 |
| 54-145872 | 11/1979 | Japan | 91/396 |
| 55-2828 | 1/1980 | Japan | 91/26 |
| 57-111915 | 7/1982 | Japan | . |
| 59-99626 | 6/1984 | Japan | . |
| 61-153910 | 7/1986 | Japan | . |
| 61-153911 | 7/1986 | Japan | . |
| 61-161627 | 7/1986 | Japan | . |
| 61-158635 | 7/1986 | Japan | . |
| 61-156613 | 7/1986 | Japan | . |
| 2024332 | 1/1980 | United Kingdom | 91/461 |

OTHER PUBLICATIONS

Okubo, Y., et al. "Newly Developed Oil-Hydraulic Operating Unit for Circuit-Breaker", Fuji Electric Review, vol. 20, No. 1 (1974), pp. 13–18.
"Operating Technology for Siemens Puffer (BK) Breakers:, Eggert et al., Siemens Power Engineering VI (1984), No. 1, pp. 36–42.
"New Series 72-204 kV Tank-type GCB", Sato et al., Mitsubishi Denki Technical Note, vol. 52, No. 7, (1978).

Primary Examiner—Robert E. Garrett
Assistant Examiner—George Kapsalas
Attorney, Agent, or Firm—Leydig, Voit & Mayer

[57] ABSTRACT

A hydraulic operating apparatus in which a differential piston is used as a drive unit, and in which the differential piston is driven by applying a high pressure fluid on a large piston face side through a hydraulic pressure control device for controlling the hydraulic pressure, and a high pressure fluid always being applied on the small piston face side. The hydraulic operating apparatus is constructed such that a high pressure fluid is applied concurrently on both piston faces when the differential piston stops at its receded position, and a thrust generated due to the difference between the forces applied on the both piston faces is held in check by a holding device acting on the differential piston or its extension. The differential piston is moved forward upon the removal of the holding force of the holding device, and the piston is moved backward upon the removal of the high pressure fluid on the large piston face side.

16 Claims, 17 Drawing Sheets

FIG. I
PRIOR ART

FIG. 6
(a) 
$a_1$ $a_2$
(b) 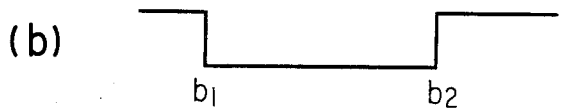
$b_1$ $b_2$
(c) 
$c_1$ $c_2$
(d) 
$d_1$ $d_2$

HYDRAULIC OPERATING APPARATUS FOR ELECTRIC CIRCUIT BREAKER

BACKGROUND OF THE INVENTION

Field of the Invention

This invention relates to a hydraulic operating apparatus for a unit for driving a load at a high speed upon the receipt of an operating command.

Pneumatic pressure such as air pressure and hydraulic pressure such as oil pressure have each been heretofore utilized as driving sources for units which have high speed linear or rotary motion, and pneumatic operating apparatuses are often used for relatively light loads.

However, when a heavy load of for example several tons is to be operated, pneumatic operating apparatuses must necessarily become larger and generate a great deal of noise due to the supply and exhaust of air at the time of operation, and the costs of maintaining an air compressor for building up the pneumatic pressure are increased, so that hydraulic operating systems are most often used.

Hydraulic operating apparatuses can easily be made to have high pressure as compared to pneumatic systems because of the relative noncompressibility of the fluid used, so that noise at the time of operation is low, the apparatus can be made small and superior response at high speed operation can be obtained.

In a hydraulic operating system, if air is mixed in the hydraulic fluid during the assembly of the apparatus or if air is dissolved in the fluid during the fluid compressing procedure, such air in the fluid delays the response speed of the apparatus and the operating time may not be constant.

One typical example of a high speed apparatus of this kind is a switching apparatus used in electrical power transmission systems.

As a power transmission system is increased in capacity and voltage, the switches particularly the power interrupters, are increasingly required to have improved performance. Not only are gas insulated interrupters in which an SF$_6$ gas is used as an arc extinguishing medium utilized, but improvements in performance which contribute to the stability of the system such as increases in switching speed and reductions in switching time differences are also desired. Also, reduction of the problems during usage such as improvements in the maintenance of the apparatus and decrease in noise generation are also being increasingly demanded.

While the present invention is described in terms of an operating apparatus for electrical power switches, the invention is also applicable to other similar high speed operating apparatuses.

DESCRIPTION OF THE PRIOR ART

FIG. 1 schematically illustrates a conventional hydraulic operating apparatus disclosed in Japanese Patent Laid-Open No. 57-111915, in which 101 is a switching unit of a switchgear such as an interrupter. The switching unit 101 comprises a stationary contact 102 and a movable contact 103 and is driven by a drive apparatus 104 to open and close the contacts. The drive apparatus 104 comprises a differential piston 106 having a rod 105 connected to the movable contact 103, and a cylinder 107, the differential piston 106 being fluidly sealed in the cylinder by a packing 106a therebetween. A conduit 108 connected to the head side (large area side) 107a of the cylinder 107 is connected to a hydraulic pressure control unit 109, which is connected to a low pressure tank 110 through a low pressure conduit 111. An accumulator 113 is connected through a port 112 to a rod side (small area side) 107b of the cylinder 107, and a high pressure conduit 114 is provided to connect it to the hydraulic pressure control device 109. Further, a pump unit 115 for supplying a high pressure fluid is provided to recover the fluid exhausted within the low pressure tank 110 through a conduit 117. Another conduit 116 is provided for supplying a high pressure to the accumulator 113 through the conduit 116.

The operation of the above-described conventional apparatus will now be described. A high pressure fluid from the accumulator 113 is always supplied through the port 112 on the rod side 107b of the differential piston 106. When an operational command for opening the switching unit 101 is supplied to the hydraulic control unit 109, the high pressure fluid supplied to the head side 107a of the differential piston 106 through the conduit 114 is exhausted to the low pressure tank 110 through the conduits 108 and 111. At this time, the passage for supplying the high pressure fluid to the conduit 108 is closed. Therefore, the high pressure fluid on the rod side 107b of the differential piston 106 pushes down the differential piston 106, opening the switching unit 101 as shown in FIG. 1. In this state, since the head side 107a of the differential piston including the conduit 108 is filled with the low pressure fluid, the packing 106a of the piston 106 must have good sealing properties so that ideally no fluid leaks between the high and low pressure fluids.

When an operating command for closing the switching unit 101 is supplied to the hydraulic control device 109, the communication passage from the conduit 108 to the low pressure conduit 111 is closed and, at the same time, the supply passage for the high pressure fluid to the conduit 108 is opened, so that the conduit 108 is communicated with the high pressure conduit 114. As a result, the high pressure fluid is supplied to both the head side 107a and the rod side 107b of the differential piston 106, and the thrust due to the difference in areas of the head side and rod side causes the differential piston 106 to move upward, thereby closing the switching unit 101. When the switching unit 101 is closed, the conduit 108 is filled with high pressure fluid.

In order to solve the above problem, a hydraulic operating apparatus is proposed which is constructed such that a hydraulic pressure applied on a large piston face side on the head side of the piston is always kept high except for the instance at which an operating command is supplied.

Apart from this, an operating apparatus for an interrupter must have a so-called "anti-pumping function". For example, when an interrupting command for removing abnormalities from the power system is supplied while a closing command is being supplied manually to the interrupter, the concurrent excitation preventing function (usually constructed by an electrical circuit) functions to achieve the interrupting operation after the closing operation has been completed. At this time, if the closing command still exists after the completion of the interrupting operation, the interrupter recloses, so that there is a possibility of the abnormalities in the electrical power system continuing. This phenomenon is called a pumping operation, which should be prevented by electrical or mechanical measures.

FIGS. 2 and 3 illustrate a conventional hydraulic operating apparatus in sectional views. In the figures, 1 is a contact of a switch which is connected to a driving unit 6 through a rod 2 for the closing and interrupting operations. The drive unit comprises a differential piston 3 for driving the contact 1, a packing 3a, a cylinder 5 and dash pot rings 4a and 4b. The drive unit 6 is operated by a main valve 7 and a high pressure fluid is supplied thereto through an amplifying valve 8. The high pressure fluid is provided from an accumulator 9 which is always maintained at a predetermined pressure by an unillustrated pump.

The high pressure fluid is supplied from the accumulator 9 to a chamber 5a on a small piston face side inside the cylinder 5 through a conduit 10 and further supplied to the main valve 7 through a conduit 11.

The main valve 7 is composed of an exhaust valve 14 and a supply valve 13 which are disposed in opposing relationship, and a spring 13a. The pilot chamber 15 of the exhaust valve 14 is subjected to the action of the high pressure fluid introduced from the amplifying valve 8 through the conduit 16. As a result, the supply valve 13 and the exhaust valve 14 operate together to switch the main valve 7. That is, when the high pressure fluid does not act on the pilot chamber 15 of the exhaust chamber 14, it is communicated with the low pressure tank 18 through the chamber 5b on the large piston face side of the differential piston 3.

On the other hand, when the high pressure fluid acts on the pilot chamber 15 of the exhaust valve 14, the chamber 5b of the large piston face side of the differential piston 3 is connected to the accumulator 9 through the conduit 11. A conduit 45 is branched from the conduit 12 for supplying the high pressure fluid to the side of the auxiliary supply valve 20 of the amplifying valve 8. Also, a conduit 46 introduces the high pressure fluid from the accumulator to the pilot chamber 21. One end of an interrupting valve 38 is connected to the pilot chamber 21 through a conduit 37 and a conduit 25, and the other end is connected to the low pressure tank 18 through a conduit 40. The amplifying valve 8 is composed of an auxiliary exhaust valve 19, an auxiliary supply valve 20 and a spring 20a and is subjected to the action of the high pressure fluid through the pilot chamber 21 of the auxiliary exhaust valve 19. Thus, the auxiliary exhaust valve 19 and the auxiliary supply valve 20 operate together to switch the amplifying valve 8. That is, when the high pressure fluid acts on the pilot chamber 21, the conduit 16 is connected to the accumulator 9 through the conduit 45. On the other hand, when the high pressure fluid does not act on the chamber 21, the conduit 16 is connected to the low pressure tank 18 through the conduit 22.

The interrupting valve 28 is composed of a ball valve 30 and a return spring 32 and is operated by an interrupting electromagnetic device 36 which moves linearly in response to a command through an operating rod.

The pilot chamber 21 of the auxiliary exhaust valve 19 is connected to the amplifying valve 8 at about its center through the contraction 24 and the conduit 23 and is also connected to the conduit 25. The conduit 25 is connected to one end of the closing valve 38 through the check valve 26 and the conduit 37, and is connected to one end of the interrupting valve 28 through the conduit 40. The interrupting valve 28 is connected to the low pressure tank 18 through the conduit 27.

The closing valve 38 and the interruption valve 28 are composed of ball valves 29 and 30 and return springs 31 and 32, respectively, and are operated by electromagnetic devices 35 and 36 which linearly move in response to commands through the operating rods 33 and 34. The electromagnetic devices are composed of the movable iron cores 35a and 36a and the stationary coils 35b and 36b.

In the interrupted state of the hydraulic operating apparatus of the above-described construction shown in FIG. 2, when a closing command is provided to the electromagnetic device 35, the movable core 35a is driven and the closing valve 38 is actuated through the operating rod 33 to open the ball valve 29. This allows the high pressure fluid to reach from the conduit 37 to the pilot chamber 21 of the auxiliary exhaust valve 19 through the check valve 26 and the conduit 25. The action of this high pressure fluid moves the auxiliary exhaust valve 19 of the amplifying valve 8 downward to close the conduit 22 connected to the low pressure tank 18 and open the auxiliary supply valve 20 disposed in opposition to the conduit 22. This allows the high pressure fluid to reach the pilot chamber 15 of the exhaust valve 14 through the conduit 12, the conduit 45 and the conduit 16 to switch the main valve 7. In this condition, since the high pressure fluid is applied via the conduits 45 and 23 as well as the contraction 24, the above new position sustains itself even when the closing valve 38 is reset. When the action of the high pressure fluid is applied to the pilot chamber 15, the exhaust valve 14 closes the conduit 17 connected to the low pressure tank 18 and the opposing supply valve 13 is opened. As a result, the high pressure fluid reaches the chamber 5b on the large area side of the differential piston 3 through the supply valve 13 and the conduit 11, and the differential piston 3 is thrust upwards in the figure by a force generated by the difference in the pressure receiving area of the differential piston 2, to close the contact 1 as shown in FIG. 3.

When an interrupting command is supplied to the electromagnetic device 36, the movable iron core 36a is driven to act on the interruption valve 28 through the operating rod 34 to open the ball valve 30. As a result, the pilot chamber 21 of the auxiliary exhaust valve 19 of the amplifying valve 8 is connected to the low pressure tank 18 through the conduits 25 and 27, so that the high pressure fluid is exhausted. Thus, the auxiliary exhaust valve 19 of the amplifying valve 8 opens and the auxiliary supply valve 20 closes. Therefore, the pilot chamber 15 of the exhaust valve 14 of the main valve 7 is communicated to the low pressure tank 18 through the conduits 16 and 22 and the high pressure fluid in the pilot chamber 15 is exhausted. When the high pressure fluid in the pilot chamber 15 is exhausted, the exhaust valve 14 of the main valve 7 opens the conduit 17 connected to the low pressure tank 18 and closes the oppositely positioned supply valve 13. Then, the high pressure fluid in the chamber 5b on the large piston face side of the differential piston 3 is exhausted through the conduit 17. As a result, the differential piston 3 is thrust in the downward direction in the figure, causing the contact 1 to break to return to the state shown in FIG. 2.

While poppet valves may replace the ball valves used in the above construction, their structure and function are similar to ball valves, so that a description thereof will be omitted.

Since the conventional hydraulic operating apparatus is constructed as described above, the conduit is a so-called high-low fluctuating circuit in which high pressure states and low pressure states alternately appear. Therefore, when a gas such as air is mixed or dissolved into the fluid, gas bubbles, which are not present when the conduit is held at a high pressure condition appear within the fluid while the conduit is held at a low pressure condition for a long period of time, resulting in the clogging of the high-low pressure fluctuating conduit.

When a high pressure fluid is again supplied into the high-low pressure fluctuating conduit under these conditions, the propagation of pressure is delayed due to the compression and collapse of the gas bubbles. Therefore, the transmission of the operational signal is delayed making switching times inconsistent.

Therefore, in such a conventional hydraulic operating apparatus, a number of time consuming preparatory operations are necessary for removing the gas within the apparatus after the assembly of the apparatus. Since these preparatory operations require prolonged period of time, when such operations are made after the apparatus has been installed in the sub-station or the like, the recovery time needed for the sub-station to come on line could be overly long, posing power sub-station management problems.

Also, in the closed state, the high pressure fluid and the low pressure fluid are fluid tightly sealed by the packing 3a. If this packing 3a is damaged due to a rapid sliding, a large amount of the high pressure fluid is discharged into the low pressure tank 18 so that the pressure within the accumulator 9 rapidly decreases.

SUMMARY OF THE INVENTION

The hydraulic operating apparatus of the present invention is constructed such that a hydraulic pressure applied on a large piston face side on the head side is always kept high except for the instance at which an operating command is supplied, and when the piston stops at its receded position, the thrust generated due to the difference between the forces applied to both of the piston faces is held in check by a holding device.

As a result, the rod side of the differential piston does not become low pressure except at the instant of operation, so that the gas dissolved into the fluid does not form gas bubbles to prevent making the switching time inconsistent.

BRIEF DESCRIPTION OF THE DRAWINGS

FIG. 6 is a time chart for explaining the operation of the apparatus shown in FIGS. 4 and 5;

DESCRIPTION OF THE PREFERRED EMBODIMENTS

Figure 1:
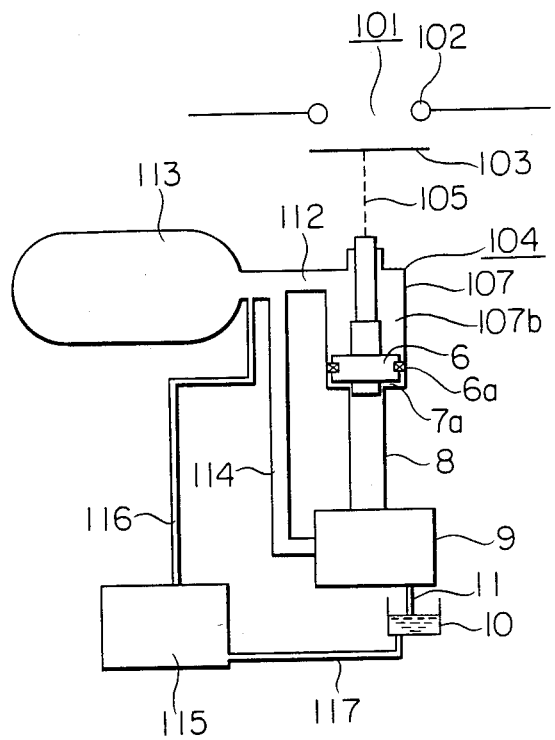
FIG. 1 is schematic diagram showing a conventional hydraulic operating apparatus.
Figure 2:
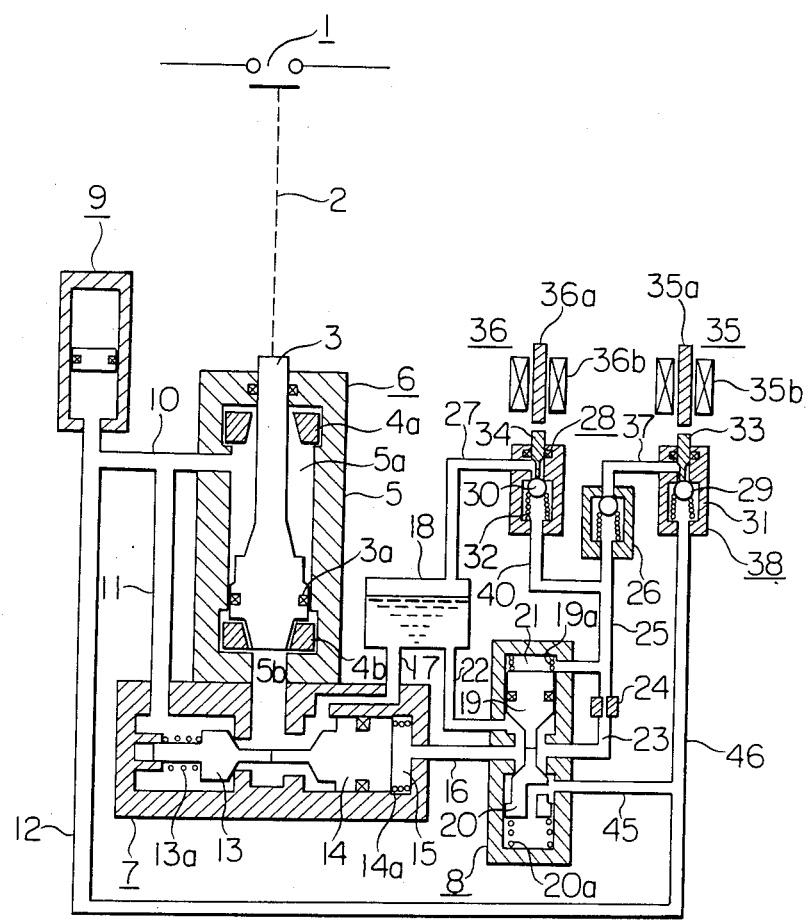
FIG. 2 is a sectional view showing in detail a conventional hydraulic operating apparatus in an interruption state.
Figure 3:
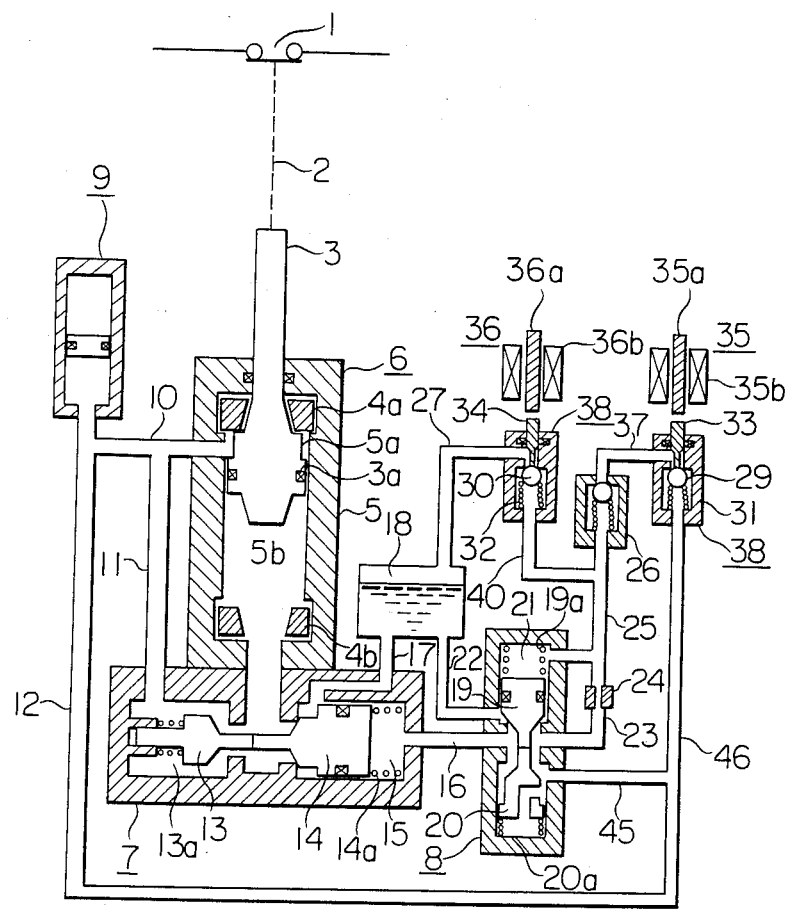
FIG. 3 is a sectional view showing the closed state of the apparatus shown in FIG. 2.

One embodiment of the present invention will now be described with reference to the drawing in FIG. 4 which shows the switchgear in the closed state. In the figure, 124 is a driving unit comprising a differential piston 126 and a cylinder 107.

The conduit 128 connected to the head side 107a of the cylinder 107 is connected to the hydraulic pressure control device 129 which is also connected to a low pressure tank 110 through a low pressure conduit 111. An engagement device 131 for holding the upward thrust of the differential piston 126 in check comprises a slidable engagement pin 132 and is connected to the hydraulic pressure control device 129 through a conduit 130. The engagement pin 132 is moved in the right and left directions in the figure according to the supply and exhaust of the hydraulic oil with respect to the engagement device 131.

The operation of the hydraulic operating apparatus of the present invention constructed as above described will now be described with reference to the time charts shown in FIG. 6. In this figure, (a) represents the on and off phases of the operating command signal, (b) represents the pressure changes in the conduit 128 and the head side of the differential piston 126, (c) represents the movement of the differential piston 126, and (d) represents the movement of the engagement pin 132.

Figure 4:
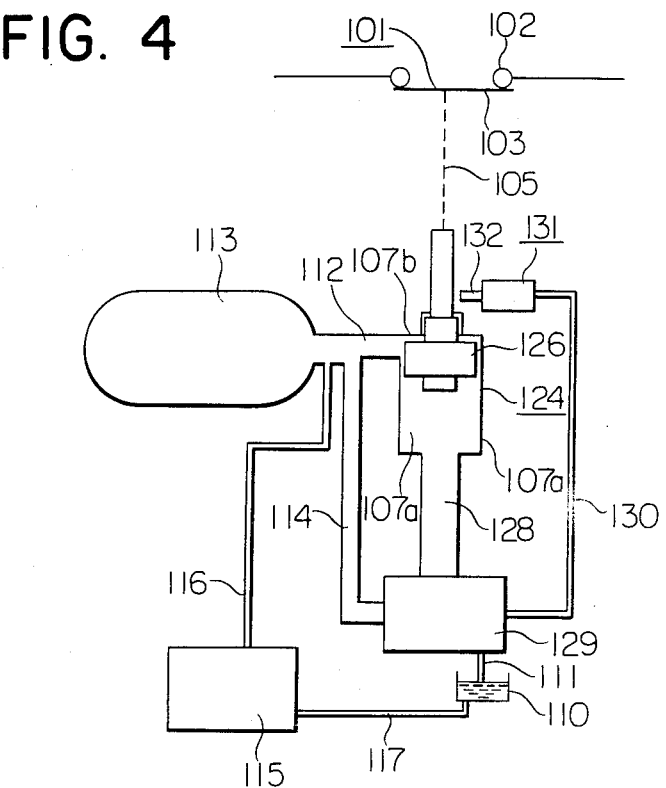
FIG. 4 is a schematic diagram showing one embodiment of the present invention in the closed state.
Figure 5:
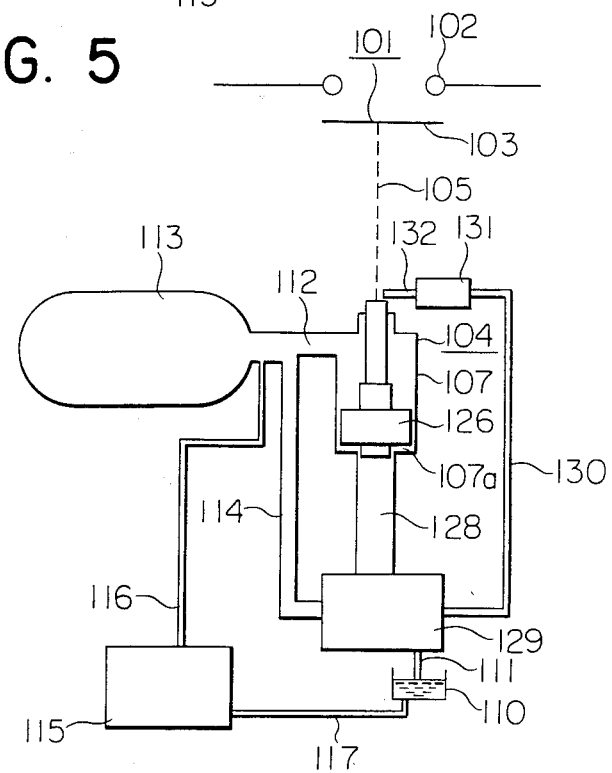
FIG. 5 is a view similar to FIG. 4 but illustrating the interruption state.

In FIG. 4 illustrating the closed state, when an operating command is given to the hydraulic control unit 129 at the point of time $a_1$ of FIG. 6(a) in order to open the switching unit 101, the high pressure fluid supplied to the head side 107a of the differential piston 126 through the conduit 114 is exhausted to the low pressure tank 110 through the conduit 128 and the conduit 111. Since the hydraulic control unit 129 is arranged so that the supply of the high pressure fluid to the conduit 128 is instantaneously stopped at this time, the inside of the head side 107a and the conduit 128 are simultaneously reduced to low pressure as shown at the point $b_1$ in FIG. 6(b). Then the differential piston 126 initiates its contact opening movement as shown by the points $c_1$ to $c_2$ in FIG. 6(c). At this time since the high pressure fluid is supplied to the engagement device 131 from the hydraulic control unit 129 through the conduit 130, the engagement pin 132 initiates its leftward movement as shown by the point $d_1$ to $d_2$ of FIG. 6(d) when the differential piston 126 has completed its movement in the contact opening direction (see FIG. 6(c), point $c_2$). The engagement between the differential piston 126 and the engagement pin 132 is completed within a short period of time (see FIG. 6(d), point $d_2$), and thereafter, by the operation of the hydraulic pressure control unit, the high pressure fluid supply path to the conduit 128 is opened, and the conduit 111 communicating with the low pressure tank 110 is closed, so that the head side 107a of the differential piston 126 and the conduit 128 are in communication with the high pressure conduit 114, with its interior filled with a high pressure fluid as shown in FIG. 6(b), the point $b_2$, presenting the interruption state shown in FIG. 5.

When an operating command for contact closing is provided into the hydraulic pressure control unit 129, the pressure within the conduit 130 drops instantaneously, whereby the force urging upon the engagement pin 132 is removed and the engagement pin 132 is returned to the right in the figure by the action of an unillustrated spring or the like disposed within the engagement device 131. At this time, since the high pressure fluid is filled within the interior of the conduit 128 and the head side 107a of the differential piston 126 and in communication with the conduit 114, the differential piston 126 is driven in the contact closing direction toward the state shown in FIG. 1 as soon as the engagement between the engagement pin 132 and the differential piston 126 is released. When the driving of the differential piston 126 is started, the high pressure fluid is supplied to the conduit 130 by the operation of the hydraulic pressure control unit 129 in preparation for the subsequent operation.

An embodiment of the present invention will now be described in more detail in conjunction with FIG.7 in which a conduit 51 supplies high pressure fluid from the accumulator 9 to the side of the auxiliary supply valve 20 of the amplifying valve 8. A conduit 52 conducts high pressure fluid from the accumulator 9 to one end of the closing valve 38 through the contraction 54 and the conduit 56 as well as to the pilot chamber 21 through the restricted orifice 53 and the conduit 55. One end of the interrupting valve 28 is connected to the pilot chamber 21 through the conduit 57 and the conduit 55 and the other end is connected to the low pressure tank 18 through the conduit 58. The conduit 56 connected to one end of the closing valve 38 is connected to the holding device 61 through the conduit 59 and the other end of the closing valve 38 is connected to the low pressure tank 18 through the conduit 60. The holding device 61 comprises a small piston 62 driven by the action of the high pressure fluid, and this small piston 62 pushes the latch 63 rotatable about the shaft 64 secured to the cylinder 5 to maintain the engaged state between the projection pin 50 secured to the differential piston 3 and the latch 63. It is to be noted that the configuration of the latch 63 is such that when the compression force on the small piston 62 is removed while the axial (upward) thrust force is being applied to the differential piston 3, the thrust on the differential piston 3 automatically disengages the latch 63 from the projection pin 50.

Next, the interrupting operation will now be described in connection with the time chart shown in FIG. 9. In the figure, (a) represents the on and off sequence i.e., first and second states of the excitation signal of a first input unit herein shown as the interrupting electromagnetic device 36, (b) represents the changes in hydraulic pressure in the pilot chamber 21 of the auxiliary exhaust valve 19, (c) represents movement in the positions of the auxiliary exhaust valve 19 and the auxiliary supply valve 20 which move together, (d) represents the changes in hydraulic pressure in the pilot chamber 15 of the exhaust valve 14, (e) represents movement in the positions of the exhaust valve 14 and the supply valve 13 which move together, (f) represents the changes in hydraulic pressure in the chamber 5b on the large differential piston face side, (g) represents the movement of the differential piston 3, and (h) represents the movement of the latch 63.

Figure 8:
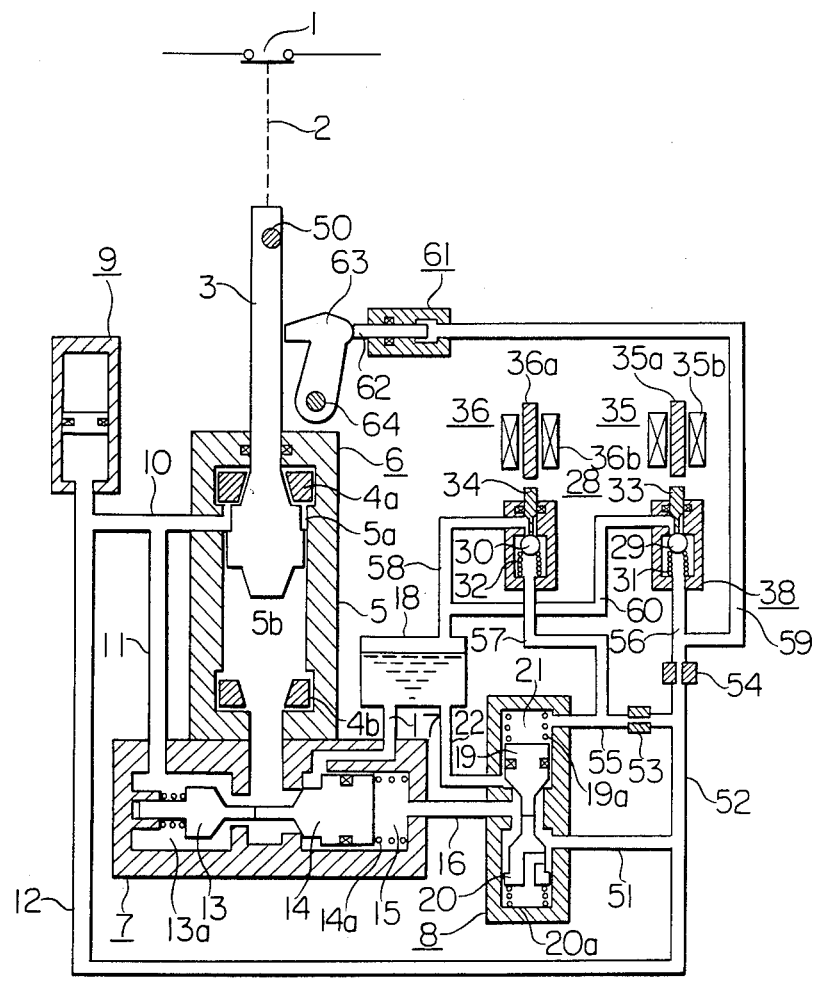
FIG. 8 is a sectional view similar to FIG. 7 but illustrating the closed state.

In FIG. 8 showing the closed state, when a command to shift the first input unit to the first state is supplied to the electromagnetic device 36 for opening the contact 1 at the time point $a_1$ of FIG. 9(a), the movable iron core 36a is driven to act on the interruption valve 28 through the operating rod 34 to open the ball valve 30.

As a result, the pilot chamber 21 of the auxiliary exhaust valve 19 of the amplifying valve 8 is connected to the low pressure tank 18 through the conduits 57 and 58, so that the high pressure fluid is exhausted at the time point $b_1$ of FIG. 9(b). Thus, the auxiliary exhaust valve 19 of the amplifying valve 8 opens and the auxiliary supply valve 20 closes at the time point $c_1$ of FIG. 9(c). Therefore, the pilot chamber 15 of the exhaust valve 14 of the main valve 7 is communicated to the low pressure tank 18 through the conduit 22 and the high pressure fluid in the pilot chamber 15 is exhausted at the time point $d_1$ of FIG. 9(d). When the high pressure fluid in the pilot chamber 15 is exhausted, the exhaust valve 14 of the main valve 7 opens the conduit 17 connected to the low pressure tank 18 and closes the oppositely positioned supply valve 13 at the time point $e_1$ of FIG. 9(e). Then, the high pressure fluid in the chamber 5b on the large piston face side of the differential piston 3 is exhausted through the conduit 17 at the time point $f_1$ of FIG. 9(f). As a result, a downward thrust in the figure is generated causing the differential piston 3 to initiate the movement in the interrupting direction at the time point $f_1$ of FIG. 9(f). When the differential piston 3 completes its movement in the interrupting direction and the projection pin 50 traverses the position of the latch 63 (FIG. 9(g), the time point $g_2$), the latch pushed by the small piston 62 of the holding device 61 which is supplied with high pressure fluid through the conduit 52 and orifice 54 initiates its rotation about the shaft 64 at the time point $h_1$ of FIG. 9(h) and engages with the projection pin 50 at the time point $h_2$. On the other hand, when the command to shift the first input unit to the second state is supplied to the electromagnetic device 36 at the time point $a_2$ of FIG. 9(a), the ball valve 30 moves upward to return due to the hydraulic pressure to close the interruption valve 28.

As a result, the high pressure fluid is gradually supplied beginning at the time point $b_2$ of FIG. 9(b) to the pilot chamber 21 through the contraction restricted orifice 53 and he conduit 55 and, when the pressure in the pilot chamber 21 reaches a predetermined value, the back pressure applied to the auxiliary valve 20 in the closed state overcomes the back pressure applied to the auxiliary exhaust valve 19, so that the auxiliary exhaust valve 19 and the auxiliary supply valve 20 move together (FIG. 9(c), the time point $c_2$). The auxiliary exhaust valve 19 of the amplifying valve 8 closes the conduit 22 connected to the low pressure tank 18 and closes the opposing auxiliary supply valve 20. Then, the high pressure fluid is supplied to the pilot chamber 15 of the exhaust valve 14 through the conduit 51 and the conduit 16 (FIG. 9(d), the time point $d_2$) to switch the main valve 7 again. When the high pressure fluid acts on the pilot chamber 15 of the exhaust valve 14, the conduit 17 connected to the low pressure tank 15 is closed and causes the opposingly positioned supply valve 13 to open at the time point $e_2$ of FIG. 9(e). As a result, the high pressure fluid reaches the chamber 5b on the large area side of the differential piston 3 through the supply valve 13 and the conduit 11 and an upward thrust is generated at the time point $f_2$ of FIG. 9(f) due to the difference in the pressure receiving areas. However, since the latch 63 has already completed its engagement with the pin 50, the above upward thrust applied to the differential piston 3 is held by the latch 63, thereby completing the interruption to maintain the condition as shown in FIG. 7.

The closing operation will now be described. In FIG. 7, when a closing command is supplied to the second input unit, herein shown as the electromagnetic device 35, to shift the second input unit to a first state and close the contact 1, the movable iron core 35a is driven to act on the closing valve 38 through the operating rod 33 to open the ball valve 29. This causes the conduits 56 and 59 to be connected to the low pressure tank 18 to exhaust the high pressure fluid. As a result, the force pushing the small piston 62 of the holding device 61 from behind is removed, but since the latch 63 is configured such that the engagement between the latch 63 and the projection pin 50 is automatically released by the thrust force of the differential piston 3 when the force of the small piston 62 is removed, the differential piston 3 starts to move upward and ultimately complete the closing operation. On the other hand, the high pressure fluid in the accumulator 9 is slowly supplied to the conduit 59 through the conduit 52 and the restricted orifice 54, providing the state shown in FIG. 8 in which the conduit 59 is filled with the high pressure fluid to be ready for the subsequent interruption when the operation of the differential piston 3 has been completed.

Since the apparatus of the present invention is arranged such that the conduit and the head side of the differential piston are almost always kept at a high pressure except for the instance at which the operation is made, any air mixed or dissolved into the fluid will not form bubbles, resulting in a constant switching time. Therefore, there is no need after the assembly of the apparatus for repeated operations to expel air mixed in the fluid, providing advantages in the operation of the substation.

Also, since the high pressure fluid is almost always supplied to the head side and the rod side of the differential piston, the provision of a fluid tight packing between the differential piston 3 and the cylinder 5 is not necessary, and no abrupt decrease in pressure due to leakage of the high pressure fluid to the low pressure tank 18 occurs.

In the description of one embodiment of the present invention, the similar advantageous effects can be obtained with the terms "interruption" and "closing" replaced with "closing" and "interruption", respectively.

While the description has been made in terms of the case where the main valve and the amplifying valve are used together for supplying and exhausting the high pressure fluid with respect to the large area side of the differential piston, it is also possible to directly supply and exhaust the high pressure fluid with respect to the large area side of the differential piston by the above amplifying valve, and similar advantageous effects can be obtained also in this case.

As has been described, since the hydraulic operating apparatus of the present invention is constructed such that a hydraulic pressure applied on a large piston face side on the head side is always kept high except for the instance at which an operating command is supplied, and when the piston stops at its receeded position, the thrust generated due to the difference between the forces applied on said both piston faces is held by a holding device, any gas dissolved into the fluid will not form gas bubbles which would make the switching time inconsistent and so there is no need after the assembly of the apparatus for repeated operations to expel air mixed in the fluid.

The hydraulic operating apparatus of the present invention is constructed such that a hydraulic pressure applied on a large piston face side on the head side and the hydraulic pressure within the conduits forming the control circuit for the main valve for the selective change is always kept high except for the instance at which an operating command is supplied, and when the piston stops at its receded position, the piston thrust generated due to the difference between the areas of said both piston rod side and the head side faces is held in check by a holding device. Therefore, the gas dissolved and mixed within the fluid does not form bubbles which would change the switching time.

Since the conventional hydraulic operating apparatus is constructed as described earlier, when only a short pulse operating command is supplied to the interrupting electromagnetic device 36, the ball valve 30 opens for an instance to lower the pressure in the pilot chamber 21 for an instant, causing the amplifying valve 8 to reverse its state. However, since the operating command last only for a very short time, the ball valve immediately returns and the high pressure fluid is again supplied from the restricted orifice 53 to the pilot chamber 21, whereby the amplifying valve 8 returns to the state immediately before the operating command is given. Thus, since the main valve 7 is also reset to the state after the reversal of the state in response to the operating command, the differential piston 3, which ultimately initiates its movement toward the interrupting direction, disadvantageously returns again to move in the closing direction (upward) before the movement is completed.

The hydraulic operating apparatus of the present invention is constructed so that the high pressure fluid for returning the hydraulic switch valve upon the completion of the interrupting operation is supplied through regions which open and close in response to the differential piston.

As a result, the hydraulic switch valve is supplied with the high pressure fluid after the completion of the operation of the differential piston is detected, and even when an operating command in the form of a short pulse is given to the interrupting electromagnetic device, the hydraulic operating apparatus properly operates.

Figure 10:
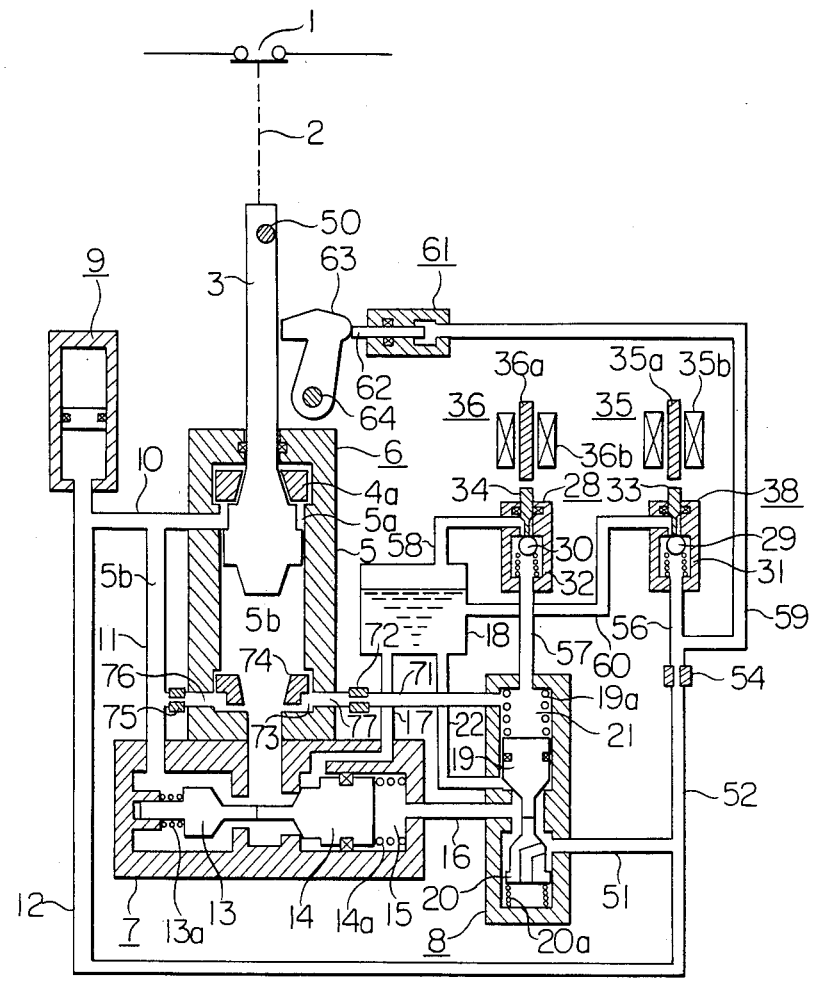
FIG. 10 is a sectional view of one embodiment of the hydraulic operating apparatus of the present invention in closed state.

Still another embodiment of the present invention will now be described in conjunction with the drawings. In FIG. 10, 74 is a dash pot ring, which is arranged to be slightly vertically slidable along the inner surface of the cylinder 5. In the state in which the piston 3 is pushed against the dash pot ring 74, the annular groove 73 formed around the dash pot ring 74 communicates the conduit 76 to the conduit 77 provided in the cylinder 5 and is isolated in an oil-tight manner from the chamber 5b on the large piston face side. Also, when the dash pot ring 74 is not pressed by the piston 3 and the fluid pressure is higher in the interior of the conduits 76 and 77 than in the chamber 5b on the large piston face side, the dash pot ring 74 is pushed upward to communicate the chamber 5b on the large piston face side to the conduits 76 and 77. The conduit 76 is connected to the conduit 11 which is always at a high pressure through a contraction 75 for regulating the discharge of the high pressure fluid to the low pressure tank 18 from the accumulator 9, and the conduit 77 is connected to the pilot chamber 21 through the contraction 72 and the conduit 71.

Next, the interrupting operation of the apparatus of the present invention will now be described in connection with the time chart shown in FIG. 12. In the figure, (a) represents the on and off (i.e., first and second) states of the excitation signal of the first input unit, herein shown as the interrupting electromagnetic device 36, (b) represents the changes in hydraulic pressure in the pilot chamber 21 of the auxiliary exhaust valve 19, (c) represents the positions of the auxiliary exhaust valve 19 and the auxiliary supply valve 20 which move together, (d) represents changes in the hydraulic pressure in the pilot chamber 15 of the exhaust valve 14, (e) represents the positions of the exhaust valve 14 and the supply valve 13 which moves together, (f) represents the changes in hydraulic pressure in the chamber 5b on the large piston side of the differential piston face side, (g) represent the movement of the differential piston 3, (h) represents the movement of the latch 63, and (i) represents the changes in hydraulic pressure within the annular groove 73.

Figure 11:
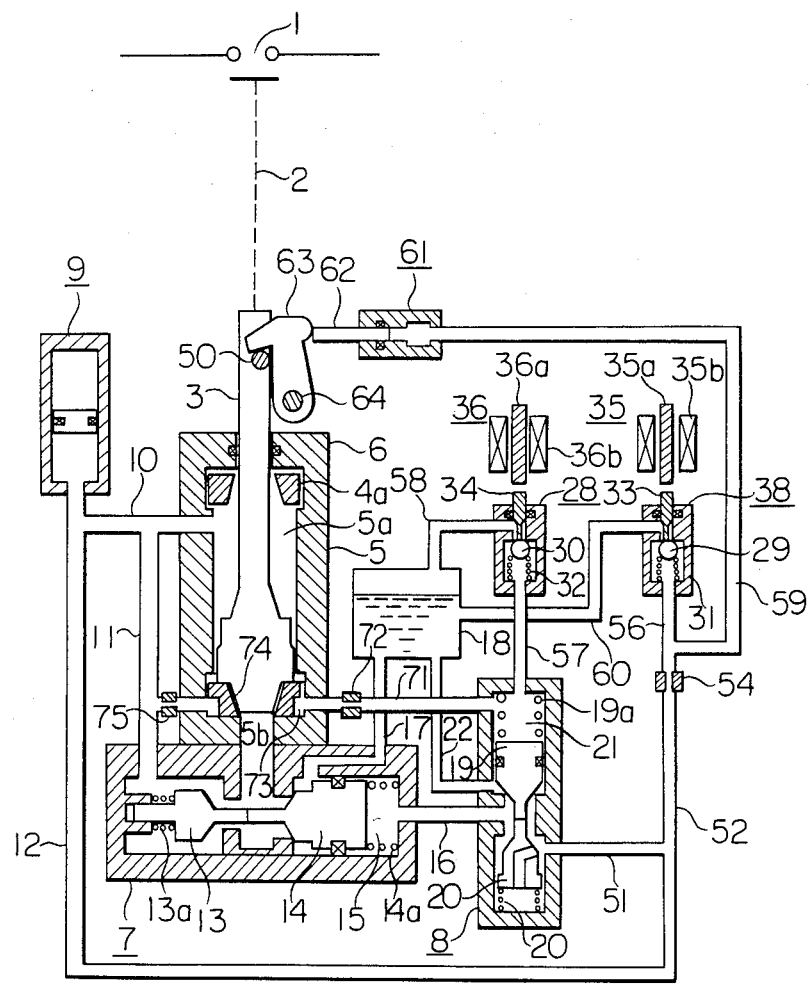
FIG. 11 is a sectional view similar to FIG. 7 but illustrating the open state.

In FIG. 11 showing the closed state, when a command to shift the first input unit to the first state is supplied to the electromagnetic device 36 for opening the contact 1 at the time point $a_1$ of FIG. 12(a), the movable iron core 36a is driven to act on the interruption valve 28 through the operating rod 34 to open the ball valve 30. As a result, the pilot chamber 21 of the auxiliary exhaust valve 19 of the amplifying valve 8 is connected to the low pressure tank 18 through the conduits 57 and 58, so that the high pressure fluid is exhausted at the time point $b_1$ of FIG. 12(b). Thus, the auxiliary exhaust valve 19 of the amplifying valve 8 opens and th auxiliary supply valve 20 closes at the time point $c_1$ of FIG. 12(c). Therefore, the pilot chamber 15 of the exhaust valve 14 of the main valve 7 is communicated to the low pressure tank 18 through the conduit 16 and the conduit 22 and the high pressure fluid in the pilot chamber 15 is exhausted at the time point $d_1$ of FIG. 12(d). When the high pressure fluid in the pilot chamber 15 is exhausted, the exhaust valve 14 of the main valve 7 opens the conduit 17 connected to the low pressure tank 18 and closes the oppositely positioned supply valve 13 at the time point $e_1$ of FIG. 12(e). Then, the high pressure fluid in the chamber 5b of the large piston face side of the differential piston 3 is exhausted through the conduit 17 at the time point $f_1$ of FIG. 12(f). As a result, a thrust in the downward direction in the figure is generated, causing the differential piston 3 to initiate the movement in the interrupting direction at the time point $f_1$ of FIG. 12(f). When the differential piston 3 completes its movement in the interrupting direction and the projection pin 50 traverses the position of the latch 63 (FIG. 12(g), the time point $g_2$), the latch pushed by the spring 88 initiates its rotation about the shaft 64 at the time point $h_1$ of FIG. 12(h) and engages with the projection pin 50 at the time point $h_2$. On the other hand, when the command to shift the electromagnetic device 36 to the second state is supplied at the time point $a_2$ of FIG. 12(a), the ball valve 30 moves upward due to the hydraulic pressure to close the interruption valve 28.

Figure 12:
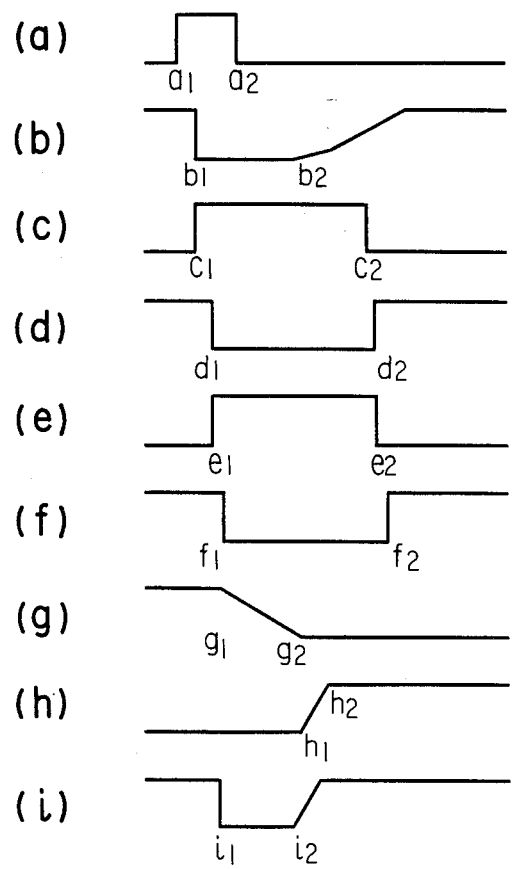
FIG. 12 is a time chart explaining the operation of the apparatus shown in FIGS. 8 and 9.

When the pressure in the chamber 5b on the large area side of the differential piston 3 is decreased, the high pressure fluid in the conduit 76 and 77 is exhausted while pushing up the dash pot ring 74, and the high pressure fluid slowly supplied from the contraction 75 is also concurrently exhausted (FIG. 12, the time point $i_2$).

Therefore, even when an operating command in the form of a pulse is supplied, once the amplifying valve 8 and the main valve 7 reverse their states, the high pressure fluid within the conduit 77 is exhausted as above described, so that even when the interruption valve 28 is closed after the removal of the operating command (i.e., shift to the second state), the amplifying valve 8 and the main valve 7 do not reverse and reset their state until the differential piston 3 completes its operation.

In this state in which the interruption has been completed, the lower surface of the dash pot ring 74 intimately contacts with the cylinder 5. Therefore, the high pressure fluid from the accumulator 9 is supplied to the annular groove 73 through the contraction 75 at the time point $i_2$ of FIG. 12 (i) and further is slowly supplied to the pilot chamber 21 through the contraction 72 and the conduit 71 at the time point $b_2$ of FIG. 12(b). When the pressure within the pilot chamber 21 reaches a predetermined value, the back pressure applied on the auxiliary supply valve 20 overcomes the back pressure applied on the auxiliary exhaust valve 19 to move the auxiliary exhaust valve 19 and the auxiliary supply valve 20 together (FIG. 12(c), time point $c_2$). The auxiliary exhaust valve 19 of the amplifying valve 8 closes the conduit 22 connected to the low pressure tank 18 and opens the auxiliary supply valve 20 to the oppositely disposed conduit 22. This causes the high pressure fluid to reach the pilot chamber 15 of the exhaust valve 14 as shown in the point $d_2$ of FIG. 12(d) through the conduits 12, 51 and 16 to switch the main valve 17 again. The exhaust valve 14 closes the conduit 17 which is connected to the low pressure tank 18 and opens the supply valve 13 disposed in opposition to the conduit 17 at the time point $e_2$ of FIG. 12(e) when the high pressure fluid acts on the pilot chamber 16. As a result, the high pressure fluid is supplied to the large area side chamber 5b of the differential piston 3 through the supply valve 13 and the conduit 11 as shown at time point $f_2$ of FIG. 12(f), and an upward thrust force is generated due to the difference in the pressure receiving areas of the differential piston 3. However, since the engagement between the latch 63 and the projection pin 50 has already been completed (FIG. 12(h), time point h₂), and since a back pressure due to the high pressure fluid supplied through the contraction 54 and the conduit 69 is applied to the small piston 62, the upward thrust is held in check by the latch 63, thus completing the interruption and the condition shown in FIG. 11 is maintained.

Figure 7:
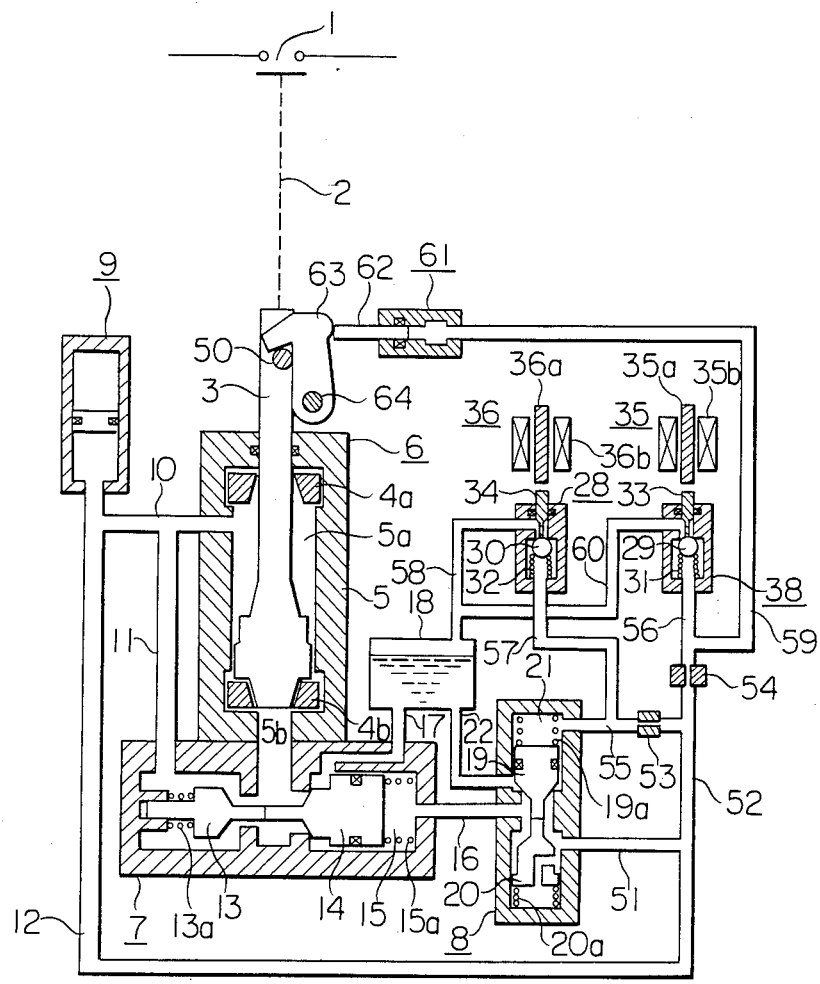
FIG. 7 is a sectional view of one embodiment of the hydraulic operating apparatus of the present invention in an open state.
Figure 9:
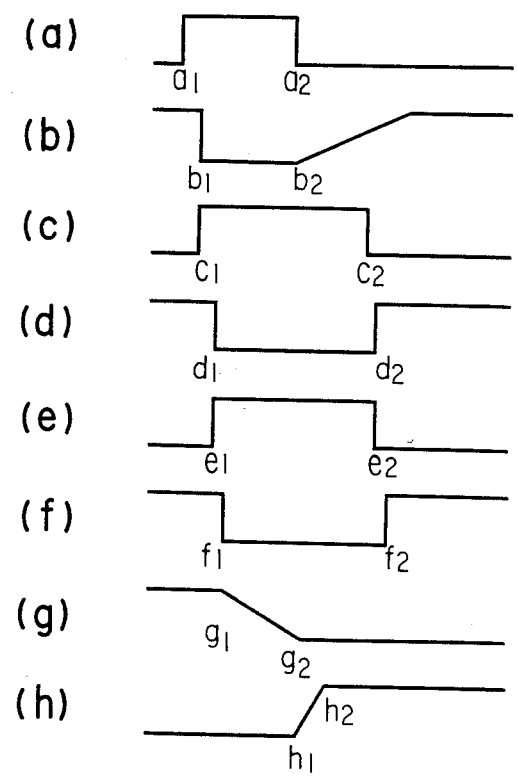
FIG. 9 is a time chart explaining the operation of the apparatus shown in FIGS. 8 and 9.

Since the closing operation using the second input unit 35 is similar to the apparatus previously described in conjunction with FIGS. 7 to 9, the description thereof will be omitted.

Figure 13:
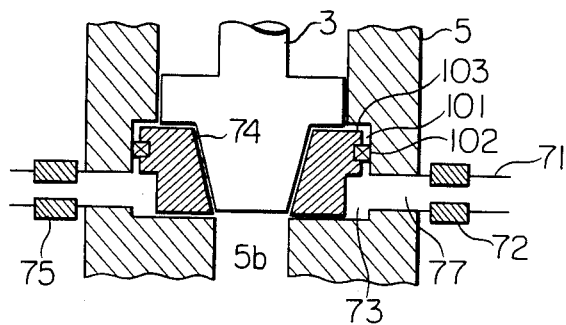
FIG. 13 is a sectional view of one embodiment of the main portion of the hydraulic operating apparatus of the present invention.

Next, another embodiment of the present invention will now be described. FIG. 13 is a sectional view showing the main portion of this embodiment of the present invention. In the figure, 102 is a packing for fluid tightly sealing the sliding clearance 101 between the piston 5 and the dash pot ring 74.

At the final state of the interrupting operation, when the differential piston 3 initiates its engagement with the dash pot ring 74, the pressure within the space defined by the differential piston 3 and the dash pot ring 74 increases, and this fluid pressure generates the controlling force. At this time, the high pressure fluid would work its way into the conduit 77 through the clearance 101 if the packing 102 were not provided.

Thus, when the braking force generated by the dash pot ring 74 is very large, the high pressure fluid intrudes into the conduit 77 through the clearance 101 since the space 103 is at a very high pressure and the fluid pressure within the conduit 77 varies, resulting in the variation in pressure in the pilot chamber 21 through the the contraction 72. Therefore an erroneous operation may occur in which the auxiliary exhaust valve 19 is actuated at time point earlier than initially set.

In such case, the pacing 102 can be provided between the cylinder 5 and the dash pot ring 74 as shown in FIG. 13 to prevent the high pressure fluid from working past the dash pot ring 74, eliminating the fear of erroneous operation.

Still another embodiment which has an object similar to the one described in conjunction with FIG. 13 will now be described.

Figure 14:
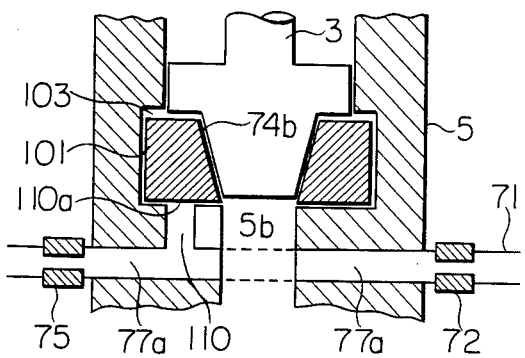
FIG. 14 is a sectional view similar to FIG. 7 but illustrating another embodiment.

In FIG. 14, 77a is a conduit for connecting the contraction 75 and the contraction 72 and is always provided with a high pressure fluid from the accumulator 9 through the contraction 75. The middle portion of the conduit 77a is branched into a conduit 110. The end of the conduit 110 which is opposite from the conduit 77a forms an opening 110a, and when the dash pot ring 74b is pushed by the differential piston 3 downward into the bottom position, the opening 110a is closed. If the pressure within the conduit 77a and 110 becomes high when the dash pot ring 74b is not completely pushed downward by the differential piston 3, the dash pot ring 74b is pushed upward by the fluid pressure, whereby the opening 110a of the conduit 110 is opened. Therefore, during the initial states of the interrupting operation, the high pressure fluid within the conduit 77a is discharged from the opening 110a, preventing the high pressure fluid from being supplied into the conduit 71 and the pilot chamber 21.

On the other hand, at the final stage of the interrupting operation, the opening 110a is closed by the dash pot ring 74b, so that the high pressure fluid within the conduit 77a supplied from the contraction 75 is maintained and the high pressure fluid is supplied into the conduit 71 and the pilot chamber 21. At this time, the high pressure fluid within the space 108 between the differential piston 3 and the dash pot ring 74b works into the clearance 101, but it does not work into the interior of the conduit 77a because the opening 110a is blocked by the dash pot ring 74b.

As has been described, since the circuit is arranged such that the high pressure fluid is supplied to the hydraulic switching valve after the interrupting operation has been completed according to the present invention, even when a pulse-like operating command is supplied to the interrupting electromagnetic device, the hydraulic operating apparatus operates properly.

Apart from this, the operating apparatus for an interrupter must have the so-called "anti-pumping function". For example, when an interrupting command for removing abnormalities from the power system is supplied while a closing command is being manually supplied to the interrupter, the concurrent excitation preventing function (usually performed by an electrical circuit) functions to achieve the interrupting operation after the closing operation has been completed. At this time, if the closing command still exists after the completion of the interrupting operation, the interrupter recloses, providing the possibility of continuing the abnormalities in the electrical power system. This phenomenon is referred to as a pumping operation, which should be prevented by electrical or mechanical measures.

Figure 15:
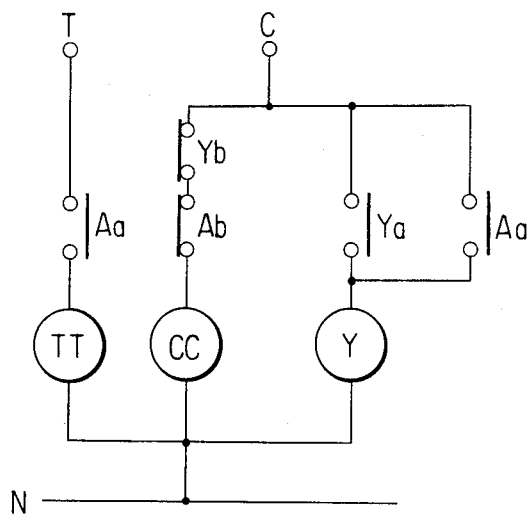
FIG. 15 is a circuit diagram of an anti-pumping device of a conventional design.

The pumping operation will be described with reference to FIG. 15, in which an interrupting command and a closing command are supplied to terminals T and C, respectively, and the interrupter is operated by energizing the interrupting coil TT or the closing coil CC. Contacts Aa and Ab are auxiliary contacts operating in cooperation with the interrupter, the contact Aa being opened and the contact Ab being closed in the interrupted state of the interrupter. In the closed state, the contact Aa is closed and the contact Ab is opened. A coil Y is an anti-pumping electromagnetic relay. When the coil Y is energized, the contact Ya closes and the contact Yb opens.

In the interruption state, for example, when a closing command is supplied to the terminal C, the closing coil CC is energized through the contacts Yb and Ab, thereby causing the interrupter to be closed. When the contact closing has been completed, the contact Aa closes and the contact Ab opens to discontinue the energization of the closing coil. At this time if the closing command lasts an electric current flows through the coil Y through the closed contact Ya to be self-held and the contact Yb opens. When an interrupting command is supplied to the terminal T under such circumstances, the interruption coil TT is energized through the contacts Aa to interrupt the interrupter, whereby contact Aa opens again to close the contact Ab. If the closing command still continues even in this state, the interrupter is re-closed and the pumping operation occurs unless the contact Yb is not inserted in series with the closing coil CC, but since the contact Yb of the self-held coil Y is inserted, no pumping operation occurs in the circuit shown in FIG. 15.

Since the conventional hydraulic operating apparatus is arranged as above described, the anti-pumping function is usually provided by an electromagnetic relay which requires a complicated control circuit. Therefore an erroneous operation may occur due to vibrations arising from the interruption itself and the apparatus becomes overly large and expensive because of the increased number of electromagnetic relays.

The hydraulic operating apparatus of the present invention utilizes a mechanical amplifying mechanism for amplifying operating signals for the holding device for holding a thrust acting on the differential piston in check, whereby the anti-pumping device of the hydraulic operating apparatus can be constructed as a mechanical means. Therefore, the anti-pumping mechanism can be made very simple and inexpensive.

The closing electromagnetic device 135 shown in FIGS. 16–21 comprises a stationary coil 135b mounted on a mount bed 80 and a movable iron core 135a. One end of the movable iron core 135a has mounted thereon an anti-pumping lever 81 pivotally mounted by a pin 82. On the side of the anti-pumping lever 81 biased by the spring 83, a notch 81a is formed and one end 84c of the trigger 84 pivotable about the pin 85 engages thereto. The trigger 84 is biased by a spring 86. A stopper 87a is provided for determining the stop position of the trigger 84. The trigger 84 is provided with an projection 84b. A holding device 87 is for determining the stop position of the trigger 84. An anti-pumping pin 89 is disposed at position opposing to the anti-pumping lever 81 and is urged from the backside by a spring 90. One end 84a of the trigger 84 which is in opposition to the anti-pumping lever 81 supports a latch 63 from it back in the interrupting state of the interrupter, to mechanically hold the engagement of the projection pin 50 and the latch 63. The latch 63 is urged from its rear by a spring 88 having a spring force selected such that when the engagement between the trigger 84 and the latch 63 is released, the engagement between the latch 63 and the projection pin 50 is automatically released.

Next, the description will now be made as to the closing operation of the above apparatus of the present invention.

Figure 16:
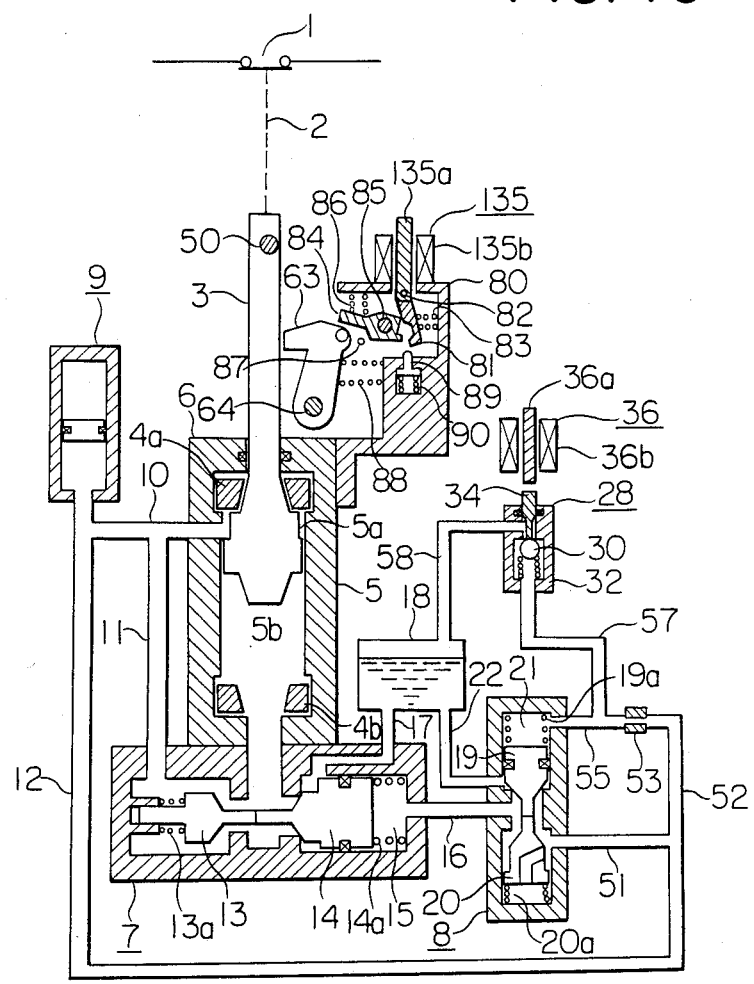
FIG. 16 is a sectional view of still another embodiment of the hydraulic operating apparatus of the present invention in a closed state.
Figure 17:
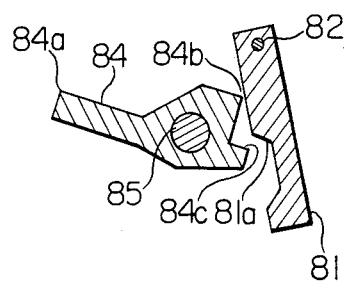
FIG. 17 is a view showing the relationship between the trigger and the anti-pumping lever in the contact closed state.
Figure 18:
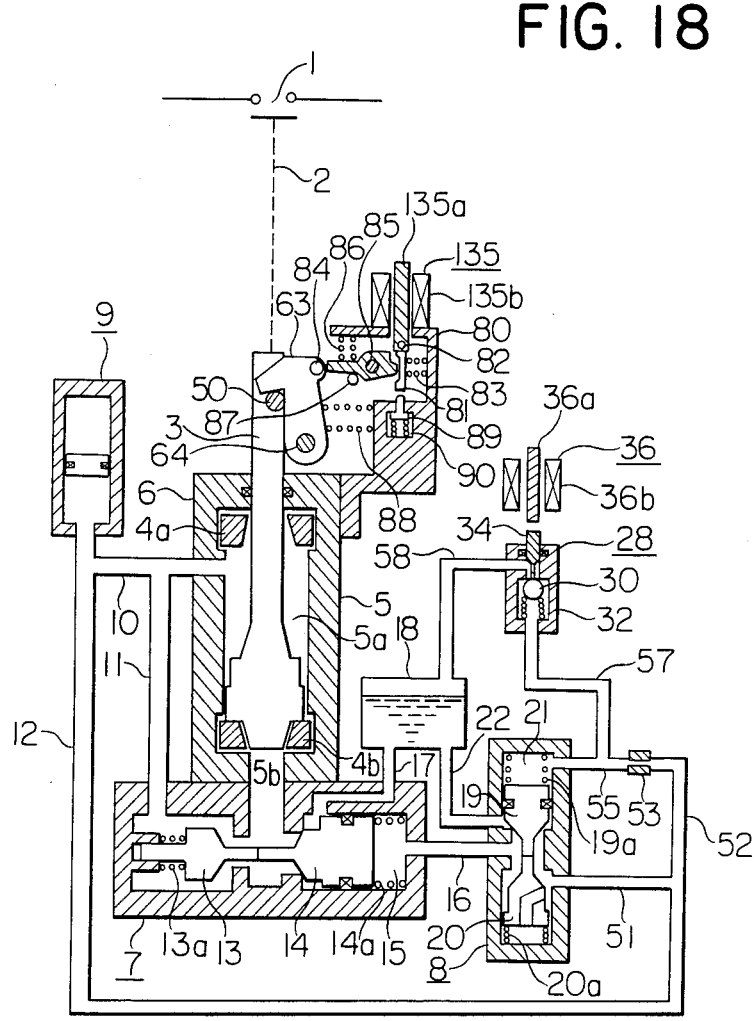
FIG. 18 is a sectional view of the apparatus shown in FIG. 16 in the contact open state.

In FIG. 18 in which the interrupting state is illustrated, when a closing command is supplied to the electromagnetic device 135 for closing the contact 1, the movable iron core 135a is driven to move the anti-pumping level 81 downward. Therefore, the one end 84c of the trigger 84 initiates a clockwise rotation of the trigger and the engagement between the end portion 84a of the trigger 84 and the latch 63 is released. At this time, the high pressure fluid is supplied to both the piston faces 5a and 5b of the differential piston 3, and the thrust of the differential piston 3 produced by the difference in area of the piston faces causes the engagement between the latch 63 and the projection pin 50 to be released, thereby moving the differential piston 3 upwards to close the interrupter. At this time, as the trigger 84 rotates, the projection 84b causes the anti-pumping lever 81 to rotate and, at the instant that the closing command is removed, the trigger 84 and the anti-pumping lever 81 take the position as shown in FIGS. 16 and 17 to complete the closing operation.

The interrupting operation will now be described. In FIGS. 16 and 17 showing the closed state, when a closing command is supplied to the electromagnetic device 36 for opening the contact 1, the movable iron core 36a is driven to act on the interruption valve 28 through the operating rod 34 to open the ball valve 30. In the same manner as in the conventional device, the amplifying valve 8 and the main valve 7 are switched, the high pressure fluid in the chamber 5b on the large piston face side of the differential piston 3 is exhausted to move the differential piston 3 downward, and when the projection pin 50 traverses the latch 63 biased by the spring 88, the latch 63 and the projection pin 50 engages, and the end portion 84a of the trigger 84 biased by the spring 86 and the latch 63 engages. Thereafter, the amplifying valve 8 and the main valve 7 return similar to the conventional device, whereby the high pressure fluid is supplied to the chamber 5b on the large piston area side and the interruption is completed in the state shown in FIGS. 18 and 19.

Figure 19:
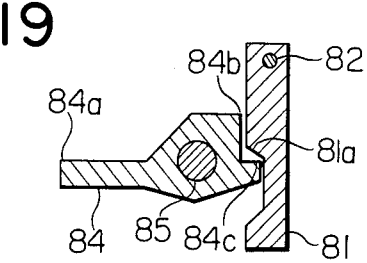
FIG. 19 is a view similar to FIG. 17 but illustrating the contact open state.
Figure 20:
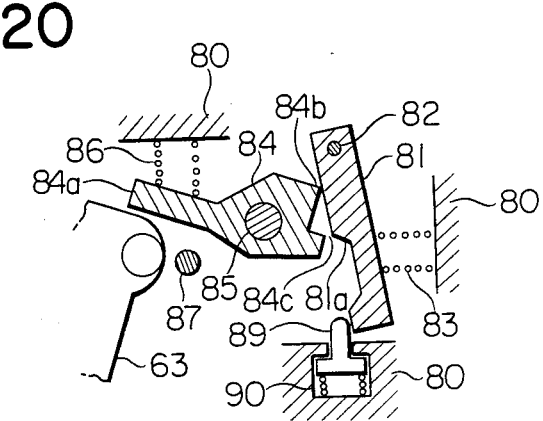
FIGS. 20 and 21 are partial sectional views showing the relationship between the trigger and the anti-pumping lever.
Figure 21:
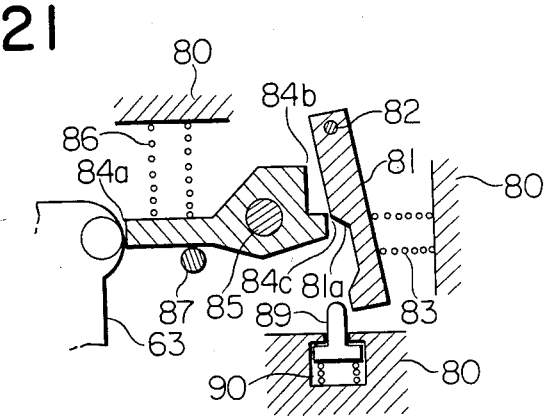

The anti-pumping function will now be described. When a closing command continues to be supplied even after the completion of the contact closure in the closed state shown in FIGS. 16 and 17, the anti-pumping lever 81 becomes engaged with the anti-pumping pin 89 as shown in FIG. 20, preventing the return of the anti-pumping level 81. In this state, when an interruption command is supplied and the differential piston 3 moves downward to engage the projection pin 50 and the latch 63, the trigger 84 is reset to hold the engagement of the projection pin 50 and the latch 63. However, since the anti-pumping lever 81 is prevented from being reset by the anti-pumping pin 89, the interrupter is not closed again unless the closing command is released and the notch 81a of the trigger 81 and the end portion 84c are brought into engagement as shown in FIGS. 18 and 19, so that the anti-pumping function is achieved.

As has been described, the hydraulic operation apparatus of the present invention is constructed such that the amplification of the operating signal of the holding device for holding the thrust acting on the differential piston in check is achieved by a mechanical amplification means with a trigger rather than a hydraulic switch valve, so that an anti-pumping function can be obtained with a very simple mechanism as compared to the conventional device utilizing electromagnetic relays. Therefore, a hydraulic operating apparatus which has high reliability and an inexpensive anti-pumping function can be obtained.

Figure 22:
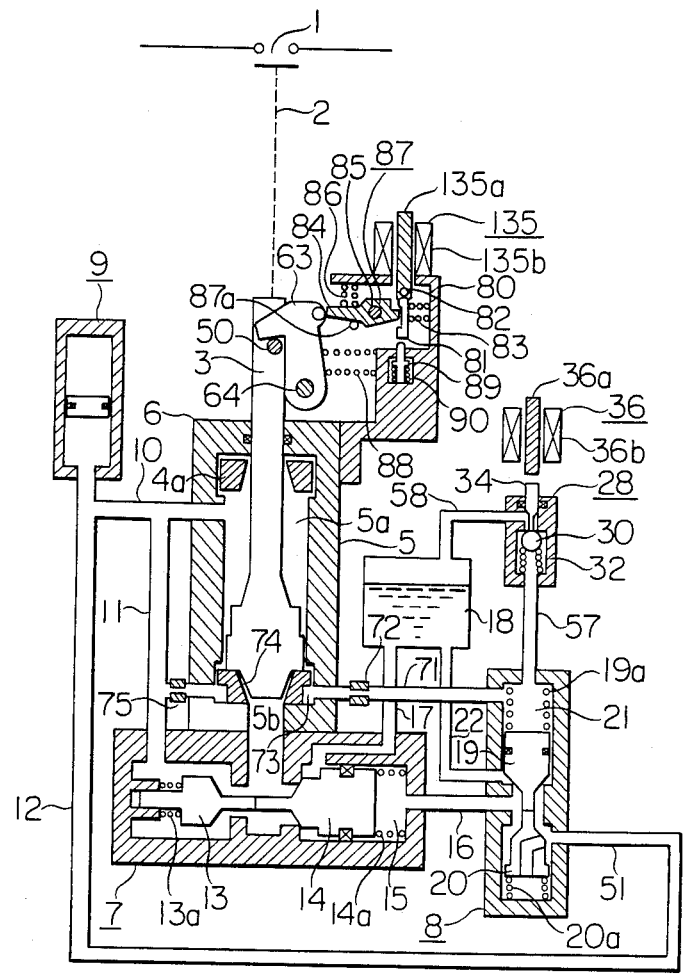
FIG. 22 is a sectional view of another embodiment of the hydraulic operating apparatus of the present invention in an open state.
Figure 23:
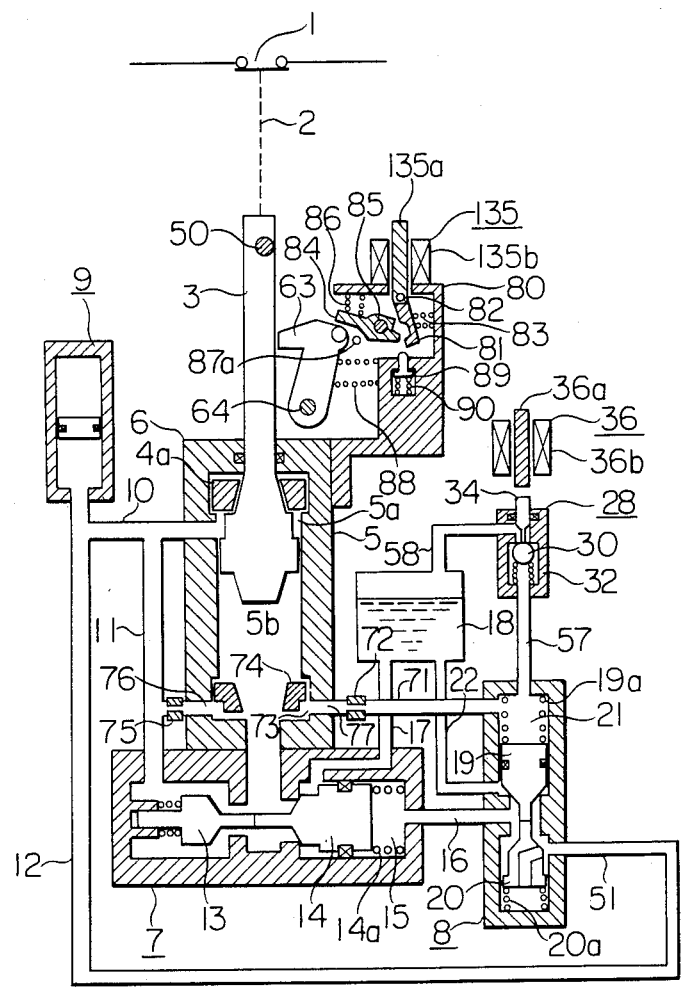
FIG. 23 is a sectional view similar to FIG. 22 but illustrating the contact closed state.

While the present invention has been described in terms of particular embodiments of the present invention, it is also possible to combine the third embodiment shown in FIGS. 10–14 with the fourth embodiment shown in FIGS. 17–22 to obtain a fifth embodiment as illustrated in FIGS. 22 and 23.

What is claimed is:

1. A hydraulic operating apparatus comprising:
   a source of high pressure fluid;
   a source of low pressure fluid;
   a hydraulic pressure control circuit connected to said sources of pressure fluid;
   a cylinder;
   a differential piston drive unit movable in said cylinder between retracted and advanced positions and having a small end face continuously supplied with high pressure fluid and a large end face selectively supplied with high pressure fluid and low pressure fluid from said sources by said hydraulic pressure control circuit;
   a valve included in said hydraulic pressure control circuit having an actuating piston and a pilot chamber continuously connected to said high pressure fluid source and receiving said valve actuating piston;
   a first input unit connected to said hydraulic pressure control circuit and operable to shift said valve to supply low pressure fluid to said large piston face and cause said drive unit to move from the advanced to the retracted position;

a holding device engageable with said drive unit upon movement of the latter to the retracted position;

said holding device being releasable to allow the drive unit to move to the advanced position in response to concurrent application of high pressure fluid to both end faces of said drive unit;

said first input unit also being operable to disconnect said pilot chamber from said low pressure fluid source while the connection of said pilot chamber to said high pressure fluid source is maintained; and a restricted orifice in the connection between said pilot chamber and said high pressure fluid source, said restricted orifice causing a delay in the supply of high pressure fluid to said pilot chamber, upon operation of said first input unit to disconnect said pilot chamber from said low pressure fluid source, until after said holding device is completely engaged to hold said drive unit against forward thrust generated due to the difference in area between the large and small piston faces when high pressure fluid is concurrently applied thereto, the high pressure fluid being at a pressure high enough to substantially prevent gas dissolved in the fluid from forming gas bubbles.

2. A hydraulic operating apparatus comprising:

a cylinder;

a differential piston movable in said cylinder between retracted and forward positions;

a hydraulic pressure control device;

said differential piston having a large piston face selectively connected by said hydraulic pressure control device to a source of high pressure fluid and a source of low pressure fluid and a small piston face continuously connected to the source of high pressure fluid;

a first valve included in said hydraulic pressure control device and operated to control said differential piston, said first hydraulic valve being operable to supply low pressure fluid to said large piston face to return said differential piston from the forward position to the retracted position and operable responsive to said differential piston being fully retracted to the retracted position to supply high pressure fluid to said large piston face such that high pressure fluid is applied concurrently to both said large piston face and said small piston face when said differential piston is in the retracted position;

a holding device engageable with said differential piston to hold said differential piston in the retracted position against forward thrust generated due to the difference in area between said large piston face and small piston face when high pressure fluid is concurrently applied thereto;

one input unit connected to receive an electrical operating signal, amplifying the electrical operating signal, and connected to supply the amplified operating signal to said holding device;

another input unit connected to receive an electrical input signal, amplifying the electrical input signal hydraulically to produce a hydraulic input signal, and connected to supply the hydraulic input signal to said hydraulic pressure control device, and a pressure releasing function member opening and closing a fluid passage in response to the movement of said differential piston to the retracted position and operable to actuate said first valve responsive thereto, the fluid passage connecting a pressure accumulator for maintaining a high pressure to said first valve.

3. A hydraulic operating apparatus as claimed in claim 2, wherein said pressure releasing function member comprises an annular member which engages with said differential piston in concentric relationship and which is slidable along the inner surface of said cylinder.

4. A hydraulic operating apparatus as claimed in claim 2, wherein a passage constricting element is disposed between said pressure releasing function member and said pressure accumulator.

5. A hydraulic operating apparatus according to claim 3 wherein said pressure releasing member includes an annular dash pot member which engages with said differential piston in concentric relationship and which is slideable along an inner surface of said cylinder, and wherein the fluid passage connecting the high pressure fluid to said first valve extends completely exterior to said cylinder.

6. A hydraulic operating apparatus according to claim 2 wherein the first mentioned input unit includes a mechanical amplification mechanism having a trigger to retain said holding device in engagement with said differential piston after said differential piston is moved to the retracted position.

7. A hydraulic operating apparatus according to claim 2 wherein the first mentioned input unit includes a mechanical amplification mechanism having a trigger to retain said holding device in engagement with said differential piston, and to release said holding device responsive to an electrical operating signal.

8. A hydraulic operating apparatus according to claim 7 wherein means are provided to reset said trigger, and said amplification mechanism includes an anti-pumping lever cooperating with an anti-pumping pin to prevent said trigger from being reset until an operating signal is released.

9. A hydraulic operating apparatus according to claim 7 wherein said first valve extends completely exterior to said cylinder and is connected to said cylinder adjacent said dash pot member.

10. A hydraulic operating apparatus comprising:

a cylinder;

a differential piston movable in said cylinder between retracted and forward positions;

a hydraulic pressure control device;

said differential piston having a large piston face selectively connected by said hydraulic pressure control device to a source of high pressure fluid and a source of low pressure fluid and a small piston face continuously connected to the source of high pressure fluid;

a first input unit connected to said hydraulic pressure control device and having first and second states;

a first hydraulic valve included in said hydraulic pressure control device and operated by said first input unit to control said differential piston, said first hydraulic valve being operable responsive to actuation of said first input unit to the first state to supply low pressure fluid to said large piston face to return said differential piston from the forward position to the retracted position, said first hydraulic valve being operable responsive to operation of said first input unit to the second state to supply high pressure fluid to said large piston face; said hydraulic pressure control device including a pressure releasing member opening and closing in response to the movement of said differential piston and closing when said differential piston is retracted to operate said first hydraulic valve; and a hydraulically-engaged holding device engageable with said differential piston after said differential piston is retracted to hold said differential piston in the retracted position against forward thrust generated due to the difference in area between said large and small piston faces when high pressure fluid is concurrently applied thereto such that the high pressure fluid is maintained at a pressure high enough to substantially prevent gas dissolved in the high pressure fluid from forming gas bubbles, said holding device being releasable from said differential piston in response to an operating command to permit said differential piston to move from the retracted position to the forward position responsive to the forward thrust.

11. A hydraulic operating apparatus according to claim 10 including a second input unit connected to control said holding device independently of said first input unit.

12. A hydraulic operating apparatus according to claim 10 wherein said first valve includes an actuating piston and a pilot chamber receiving said actuating piston, a continuous connection including a restricted orifice to supply high pressure fluid to said pilot chamber from the high pressure fluid source, and means responsive to actuation of said first input unit to the first and second states for respectively connecting and disconnecting said pilot chamber to the low pressure fluid source to move said actuating piston and actuate said first valve to control said differential piston.

13. A hydraulic operating apparatus according to claim 12 including a second valve connected to the sources of pressure fluid and having an actuating piston to shift said second valve between supply and exhaust positions, said large end face of said differential piston receiving high pressure fluid and low pressure fluid from the sources in the supply and exhaust positions, respectively, of said second valve, and said first valve being connected to apply high pressure fluid and low pressure fluid selectively from the sources to said second valve actuating piston and thereby shift said second valve between its positions, said restricted orifice in the connection between said pilot chamber and the high pressure fluid source causing a delay in the supply of high pressure fluid to said pilot chamber and supply of low pressure fluid to said second valve actuating piston upon operation of said first input unit to disconnect said pilot chamber from the low pressure fluid source until after said differential piston is fully retracted and said holding device is engaged.

14. A hydraulic operating apparatus according to claim 13 wherein said pressure releasing member includes an annular dash pot member which engages with said differential piston in concentric relationship and which is slidable along an inner surface of said cylinder, and wherein said connection between said pilot chamber and the high pressure fluid source communicates with said cylinder adjacent said dash pot member.

15. A hydraulic operating apparatus according to claim 14 wherein said connection between said pilot chamber and the high pressure fluid source includes a restricted orifice upstream of said cylinder.

16. A hydraulic operating apparatus according to claim 13 wherein said connection between said pilot chamber and said high pressure fluid source includes a restricted orifice upstream of said cylinder and a restricted orifice downstream of said cylinder.

* * * * *